United States Patent
Iverson et al.

(10) Patent No.: US 7,158,979 B2
(45) Date of Patent: Jan. 2, 2007

(54) SYSTEM AND METHOD OF DE-IDENTIFYING DATA

(75) Inventors: Dane Steven Iverson, Eden Prairie, MN (US); Karen Muthler Davis, South Glastonbury, CT (US)

(73) Assignee: Ingenix, Inc., Eden Prairie, MN (US)

( * ) Notice: Subject to any disclaimer, the term of this patent is extended or adjusted under 35 U.S.C. 154(b) by 461 days.

(21) Appl. No.: 10/151,974

(22) Filed: May 22, 2002

(65) Prior Publication Data
US 2003/0220927 A1 Nov. 27, 2003

(51) Int. Cl.
*G06F 17/00* (2006.01)
*G06F 12/00* (2006.01)

(52) U.S. Cl. .......................................... 707/100; 707/10

(58) Field of Classification Search ............... 707/1–4, 707/100–102, 104.1
See application file for complete search history.

(56) References Cited

U.S. PATENT DOCUMENTS 6,418,441 B1 * 7/2002 Call ........................... 707/10
2001/0054155 A1 * 12/2001 Hagan et al. ............... 713/193
2002/0002550 A1 * 1/2002 Berman ........................ 707/3
2002/0073099 A1 * 6/2002 Gilbert et al. ........... 707/104.1

* cited by examiner

Primary Examiner—Sam Rimell
(74) Attorney, Agent, or Firm—Fulbright & Jaworski LLP (57) ABSTRACT

A method of de-identifying data, wherein the data to be de-identified is stored in a transaction table containing transactions and a personal information table containing identifiable information. The method includes the steps of generating a de-identification pointer associated with an individual in the personal information table, wherein the individual is associated with at least one transaction in the transaction table; creating a non-protected transaction table, wherein the non-protected transaction table includes a non-protected transaction reference and non-protected information associated with a transaction from the transactional table; and creating an index table including the identification and the non protected transaction reference. According to a preferred embodiment, the identification is advantageously unique and may also lack context to the individual. According to a further feature, the identification may be random or pseudo-random.

13 Claims, 6 Drawing Sheets

202 SECURE CROSS-REFERENCE TABLE

| NAME | SSN | DOB | DE-ID POINTE |
|---|---|---|---|
| J. DOE | 123-45-6789 | 12/14/77 | 123456 |
| B. SMITH | 224-78-1111 | 4/1/82 | 211135 |
| M. JONES | 077-38-9012 | 1/7/73 | 301456 |

204 DE-IDENTIFICATION INDEX TABLE

| DE-ID POINTE | CLAIM ID |
|---|---|
| 123456 | 4329 |
| 211135 | 1073 |
| 123456 | 2049 |
| 301456 | 1990 |
| 123456 | 2002 |

205 NON-PROTECTED CLAIM TABLE

| CLAIM ID | DATE | CODE | PROC CODE | AMOUNT |
|---|---|---|---|---|
| 4329 | 1/7/01 | 2B | 55 | $27 |
| 1073 | 1/7/01 | 3A | 77 | $112.73 |
| 2049 | 9/20/01 | 4B | 22 | $77.47 |
| 1990 | 10/11/01 | 7A | 91 | $123.89 |
| 2002 | 02/03/02 | 4A | 73 | $404.73 |

SYSTEM AND METHOD OF DE-IDENTIFYING DATA

FIELD OF INVENTION

The present invention relates to data processing systems and, more particularly, to a system for and method of de-identifying data.

BACKGROUND

Privacy concerns among individuals and lawmakers have grown in recent years. It is desirable for companies that store records containing individually identifiable information to secure the information so that it is not readily available to those users who do need access to the information. For example, in 1996, Congress enacted the Health Insurance Portability and Accountability Act (HIPAA). HIPAA imposes strict privacy rules on the insurance and health care industries. In a broad sense, HIPAA protects a patient's privacy in his or her medical records and secures a patient's individual health care information.

In addition to securing identifiable information, companies still need to "de-identify" protected information received or created in the course of business. De-identified data is data, alone or in combination with other information, that cannot readily identify an individual. A company may need to de-identify individually identifiable information so that the company may continue to perform research on the data and/or distribute the de-identified data to third parties. By de-identifying all individually identifiable information, an individual's identity and personal information that may identify that individual will still be protected. Traditionally, companies de-identify records by "stripping" out all individually identifiable information from those records.

Once the identifiable information is de-identified, the de-identified data may generally be used or disclosed for any purpose (e.g., research), as long as it is not re-identified. The protected identifiable information is generally stored in a database administered by a company. These databases may be organized as sets of tables. One or more tables may include all personal identifiable information related to an individual and include data elements, such as social security number, name, age, date of birth and address. Another table(s) may include transaction information associated with transactions submitted by and for individuals and may include data elements, such as social security number, date of transaction, transaction code, amount and transaction ID. The transaction ID may be unique for each transaction in the transaction table.

Depending how a company has organized its identifiable information and its transaction information, the individual information table may be a table located within a master database or as part of a separate database. Similarly, the transaction table may be a table located within a master database or as part of a separate database. Whether separate databases or specific types of tables within the same master database, at least one field is present to link the record to one or more other elements in the database, for example the social security number and, possibly the transaction ID, may be included in each table so that related information may be linked across tables or databases.

For example, health care information databases may include personal identifiable information related to an individual, such as an individual information table. An individual information table may include data elements, such as social security number, name, date of birth, address, member number, and Medicare status. Another table(s) may include claim transaction information associated with health care claims (transactions) submitted by and for patients in the individual information table, such as a transaction table. A transaction table may include data elements, such as social security number, date of service, diagnosis code, procedure code, billed amount and transaction ID. The transaction ID may be unique for each claim in the transaction table.

Figure 1:
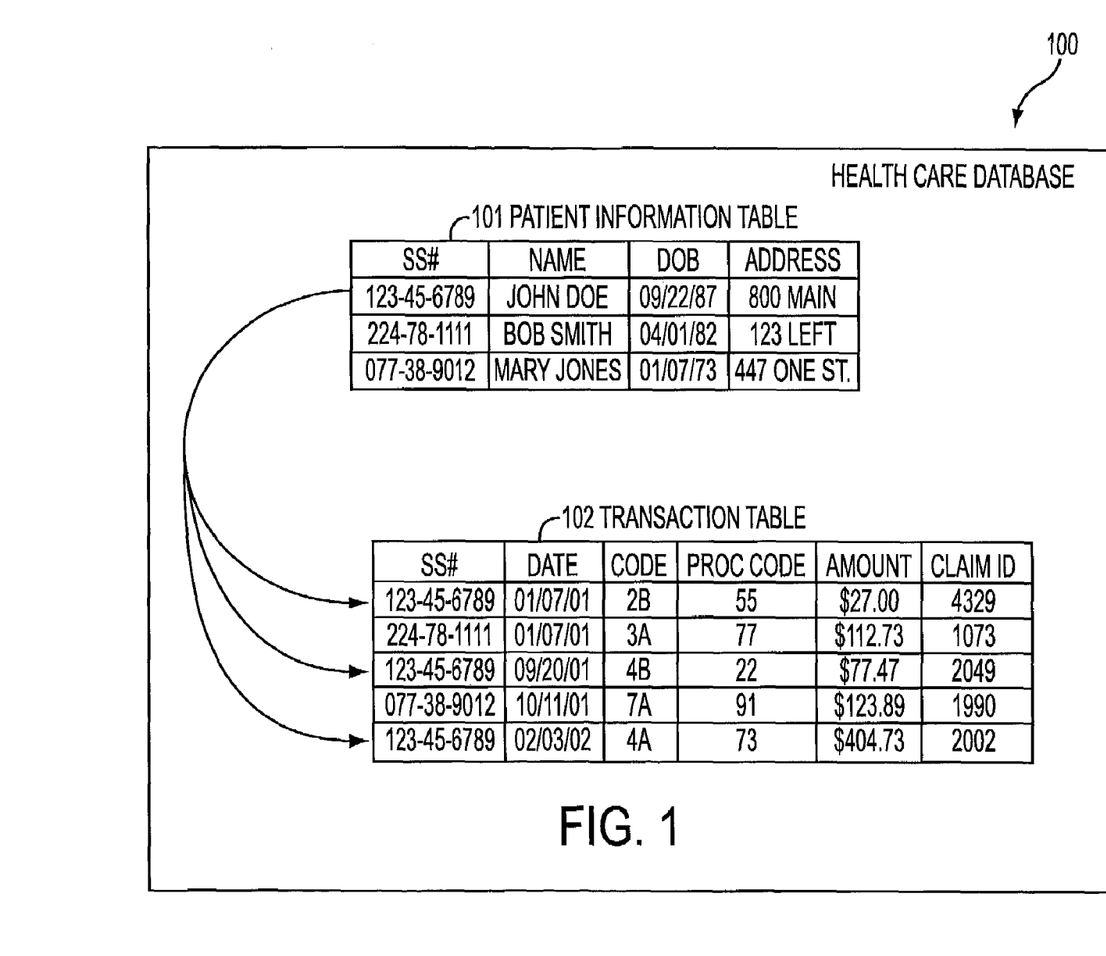
FIG. 1 shows a prior-art database storing individually identifiable information.

FIG. 1 shows a portion of an exemplary health care database schema 100 with individual information table 101 and transaction table 102. An individual in individual information table 101 may be linked to one or more transactions in transaction table 102 by the individual's social security number. For example, social security number 123-45-6789 is linked to three transactions (transaction ID nos. 4329, 2049 and 2002).

To limit access to the databases and tables within a company's databases, a company (or database administrator) may use "role based security." Commonly available in most major Data Base Management Systems (DBMS), role based security controls access to tables and/or data elements within tables by user. Role based security also defines access levels for each database user located within database's security scheme. For example, user A may have a certain level of access authorization that enables user A to view all data elements and all tables of a particular database. In contrast, user B may have a limited level of access authorization that enables user B to access half of the tables and, of those tables user B may access, access is further limited to only 50% of the data elements within each table.

As explained, most of the information that privacy regulations may mark as protected is individually identifiable information and may be used to identify an individual. Accordingly, there is a need to de-identify data, to make de-identified data available, and to protect individually identifiable information from uses that fall outside those permitted uses in various privacy regulations.

SUMMARY OF THE INVENTION

A method of de-identifying data, wherein the data to be de-identified is stored in a transaction table containing transactions and a personal information table containing identifiable information. The method includes the steps of generating a de-identification pointer associated with an individual in the personal information table, wherein the individual is associated with at least one transaction in the transaction table; creating a non-protected transaction table, wherein the non-protected transaction table includes a non-protected transaction reference and non-protected information associated with a transaction from the transactional table; and creating an index table including the identification and the non protected transaction reference. According to a preferred embodiment, the identification is advantageously unique and may also lack context to the individual. According to a further feature, the identification may be random or pseudo-random.

DETAILED DESCRIPTION

An embodiment consistent with the present invention de-identifies individually identifiable information. Individually identifiable information must be de-identified, in many cases, before a user may access the information. Identifiable data includes attributes that may positively identify an individual associated with the identifiable data. An embodiment consistent with the present invention, de-identifies identifiable data so that a user may access the data without identifying an individual associated with the data. De-identified data is data that is not identifiable as belonging to a particular individual. Identifiable data may be de-identified by removing data elements that could potentially identify the individual (e.g., name, telephone number, social security number, account numbers).

To de-identify the identifiable data, methods and systems consistent with the present invention generate a random identification pointer not derived from the identifiable information, known as a "de-identification pointer." Each de-identification pointer is associated with an individual and the individual's personal identifiable information, but the pointer is not derived from the individual's personal identifiable information. The de-identification pointer enables a user to obtain de-identified data since the de-identification pointer is substituted for all personal identifiable information for the same individual. The de-identification pointer and associated identifiable information may be stored in a secure table not accessible to users. Since a de-identification pointer assumes the role of the identifiable information, a user that requires access to de-identified data will not need to access any identifiable information stored in a secure table The de-identification pointer may also be stored in an index table. The index table links the individual (using the de-identification pointer) and claims (transactions) associated with the individual. A user that requires access to de-identified data may access the index table since the index table provides a link to transaction data without identifying the individual. That is, the index table enables a user to retrieve transaction and transaction information from a non-protected transaction table without identifying the individual associated with the transaction.

The present invention provides a number of benefits over traditional de-identification systems. First, the present invention enables users to automatically access transaction information without identifying an individual associated with the transaction information. Second, the present invention enables a collector of identifiable information (e.g., a health care provider or a health care payor) to de-identify the individually identifiable information and use such de-identified information for various purposes, such as research. For example, a user may "mine" the de-identified data for information (e.g., number of patients having diabetes or number of times a particular patient visited the hospital). Third, the present invention effectively limits access to only non-protected information by running a de-identification process on the individually identifiable information. After the de-identification process has been executed on the individually identifiable information, all identifiable information will be de-identified. The de-identification pointer, database views and role-based security together prohibit a user from accessing the individually identifiable information.

Figure 2:
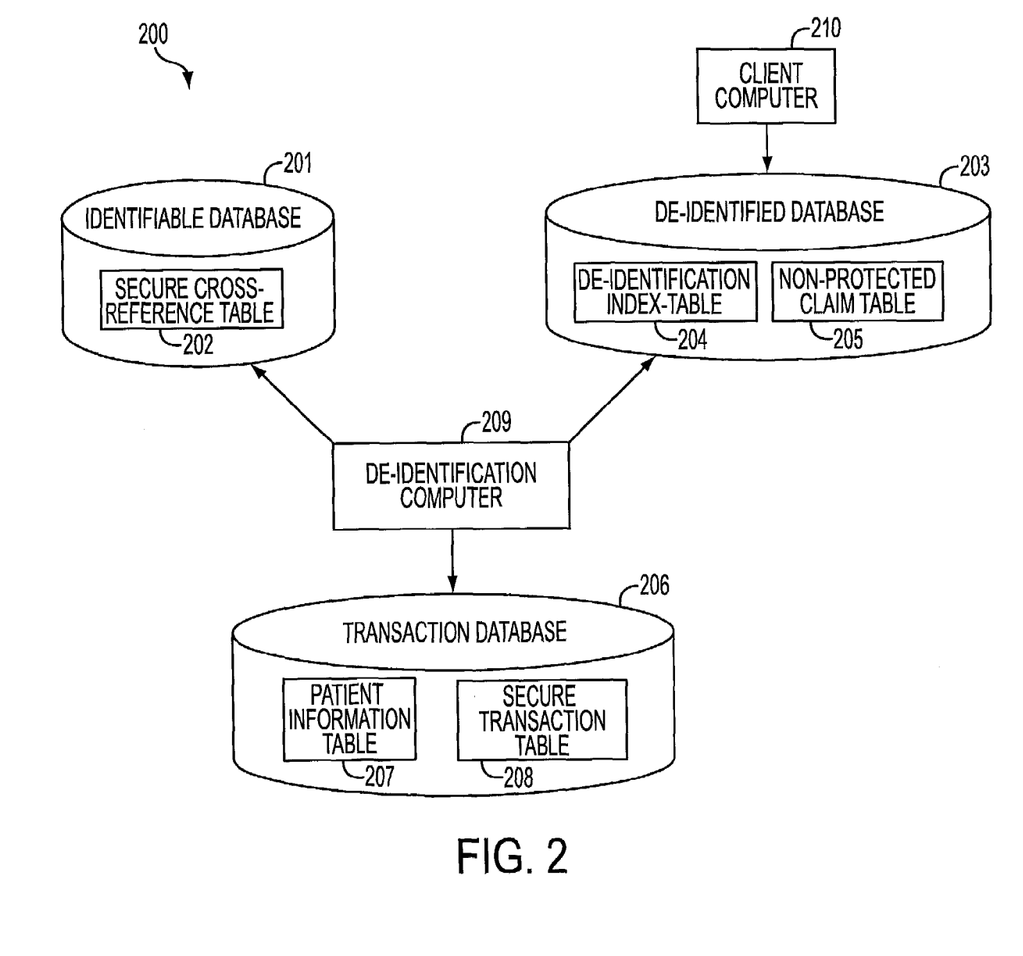
FIG. 2 shows an embodiment of a system for use with methods and systems consistent with the present invention.

FIG. 2 depicts a data processing system 200 suitable for practicing methods and systems consistent with the present invention. Data processing system 200 includes identifiable database 201 and de-identified database 203 both connected to transaction database 206 and de-identification computer 209. Client computer 210 may be connected to de-identified database 203. Identifiable database 201 may contain protected information, such as individually identifiable information associated with individuals in a secure cross reference table 202. As such, only a user with a sufficient level of access may access information in identifiable database 201, such as a database administrator administering the de-identification process.

De-identified database 203 may contain de-identified information based on the individually identifiable information in transactions database 206. The information in de-identified database 203 does not identify an individual. As such, a user may access de-identified database 203 to obtain information without identifying the individual. For example, de-identified database 203 may contain non-protected information, such as de-identified data associated with individuals in a de-identification index table 204 and non-protected transaction table 205.

Transactions database 206 may contain a personal information table, such as a individual information table 207 and a secure table, such as a secure transaction table 208. Since individual information table 207 and secure transactional table 208 contain protected information, these tables are generally inaccessible by an unauthorized user.

De-identification computer 209 may contain software to create secure cross-reference table 202 and de-identification index table 204 and non-protected transaction table 205 based on information stored in individual information table 207 and secure transactions table 208 in transactions database 206. A user may use software on client computer 210 to obtain de-identified data (e.g., by accessing de-identification index table 204) in de-identified database 203.

Although only one client computer 210 is depicted, one skilled in the art will appreciate that data processing system 200 may contain many more client computers and additional client sites. One skilled in the art will also appreciate that client computer 210 may come with de-identified database 203 already installed.

Figure 3:
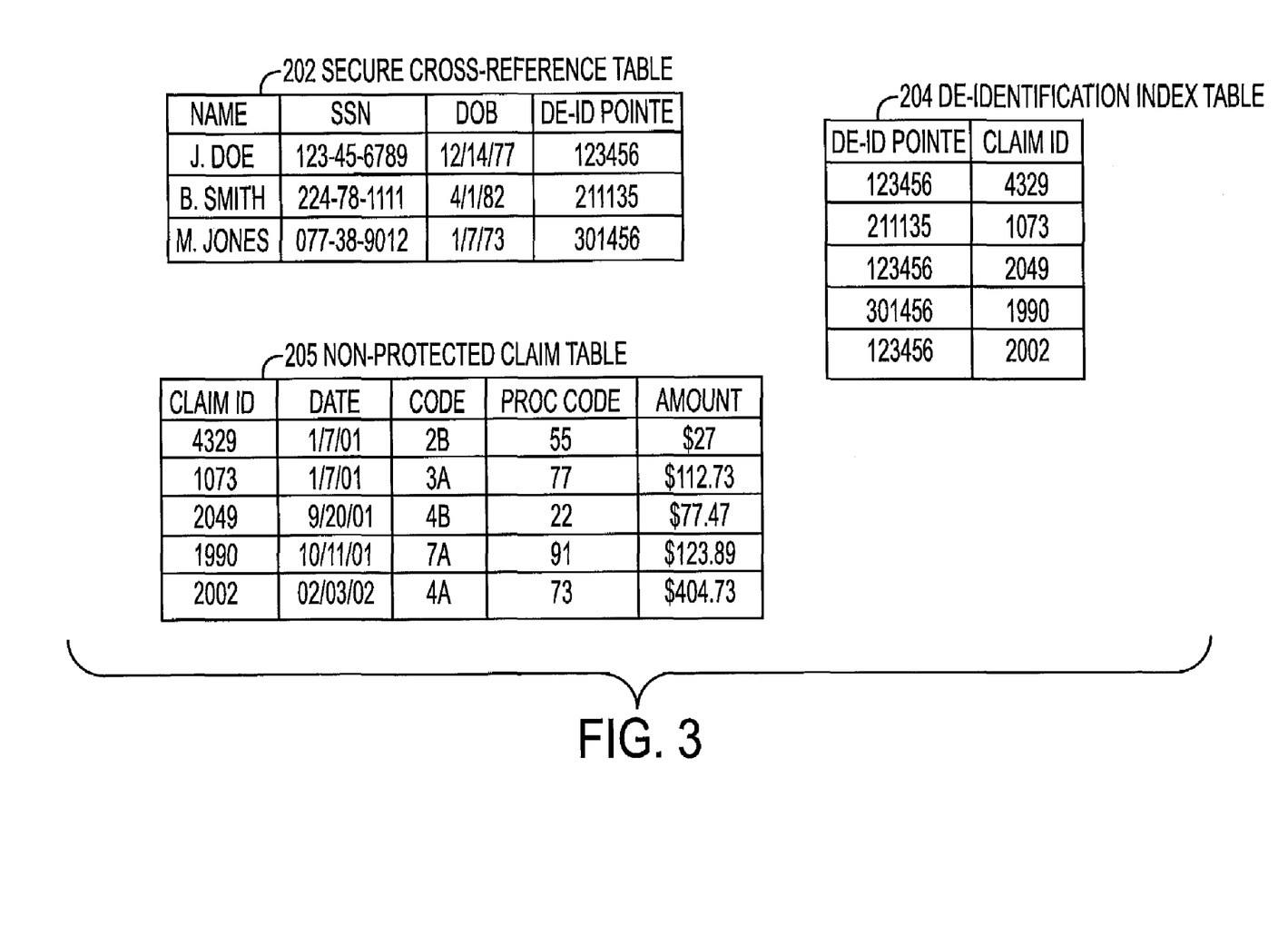
FIG. 3 shows an exemplary de-identified scheme storing de-identified data for use with methods and systems consistent with the present invention.

FIG. 3 shows an exemplary secure cross-reference table 202, de-identification index table 204 and non-protected transaction table 205. Secure cross reference table 202 may contain identifiable information, such as name, social security number and date of birth. Secure cross reference table 202 may also contain de-identified data, such as a de-identification pointer. De-identification index table 204 may contain de-identified data, such as a de-identification pointer and a transaction ID. Non protected transaction table 205 may also contain de-identified data. As explained, the de-identification pointer enables a user to obtain protected identifiable information without identifying the individual associated with the information. For example referring to FIG. 3, de-identification pointer 123456 is linked to patient "J. Doe" and transaction ID 4329, 2049 and 2002. De-identification pointer 123456 is a random number not related to identifiable information, such as name, social security number, date of birth. A user may use de-identification pointer 123456 to access de-identified transaction information in the non-protected transaction table. By using the de-identification pointer and not identifiable information, the user will be unable to identify the individual associated with the de-identified data.

A user may access de-identified data by using de-identified index table 204 and non-protected transaction table 205. Methods and systems consistent with the present invention use role based security to ensure that the data does not become identifiable and so that the user may not access secure cross-reference table 202.

Figure 4A:
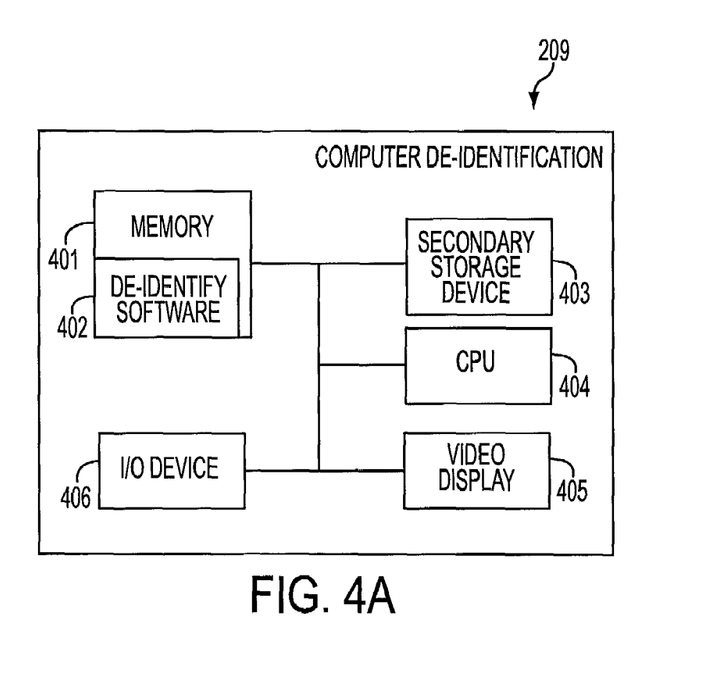
FIG. 4A is a block diagram showing additional detail of the de-identification computer according to an embodiment of the invention as depicted in FIG. 2.

FIG. 4A depicts a more detailed view of de-identification computer 209, which contains memory 401, secondary storage device 403, central processing unit (CPU) 404, video display 405 and input/output (IO) device 406. Memory 401 stores de-identify software 402 that accesses identifiable database 201, de-identified database 203 and transactions database 206 to create de-identification index table 204 and non-protected transaction table 205.

Figure 4B:
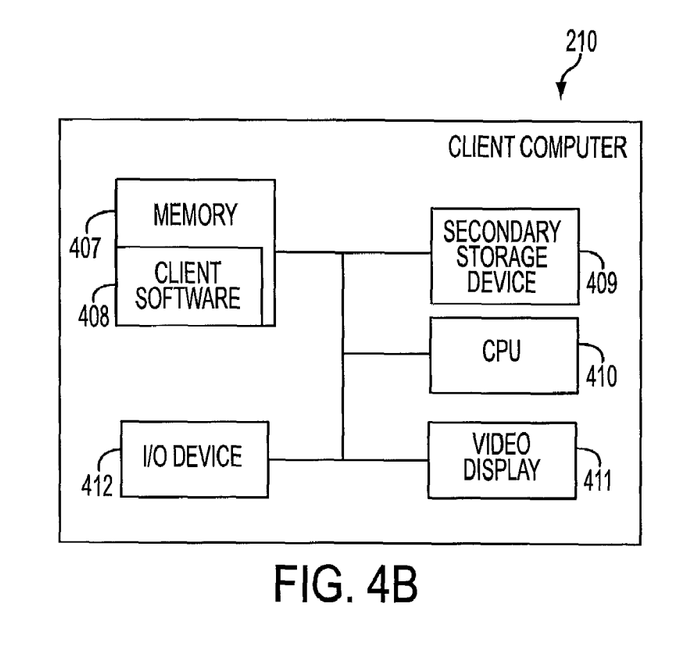
FIG. 4B is a block diagram showing additional detail of the client computer according to an embodiment of the invention as depicted in FIG. 2.

FIG. 4B depicts a more detailed view of client computer 210, which contains memory 407, secondary storage device 409, central processing unit (CPU) 410, video display 411 and input/output (IO) device 412. Memory 407 stores client software 408 that may access de-identified database 202. An example of client software 408 may be the Business Intelligence Tools software, available from Sagent, Inc. or the MS Access Software, available from Microsoft.

Figure 5:
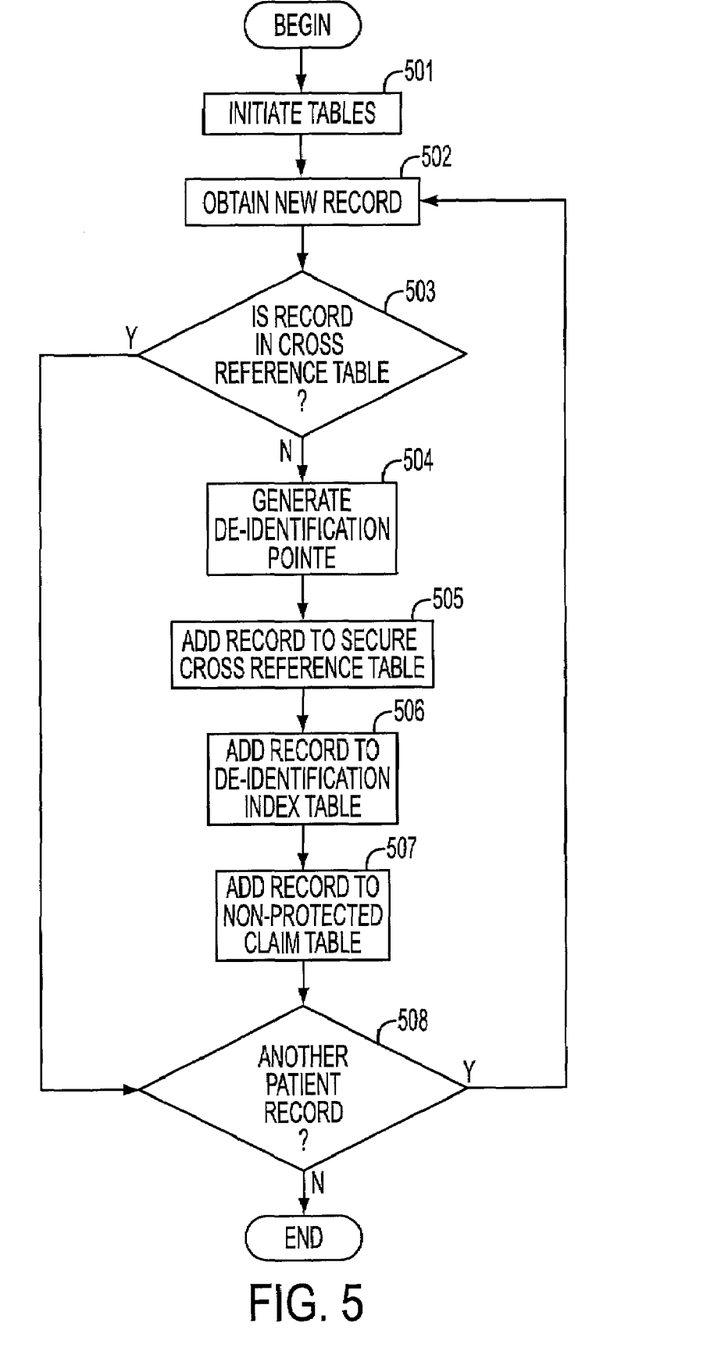
FIG. 5 shows a flow chart representing one embodiment of the present invention.

FIG. 5 is a flow chart consistent with one embodiment of the present invention when de-identifying individually identifiable information. To protect identifiable information from being seen by a user, the steps in FIG. 5 may be performed by an independent technical team with a sufficient level of access to identifiable database 201 and transaction database 206. In Step 501, de-identify software 402 initiates secure cross reference table 202, de-identification index table 204 and non-protected transaction table 205. By implementing database views, transaction database 206 may be made secure. Once the tables are initiated, software 402 obtains a new record from individual information table 207 in transaction database 206 (step 502). Software 402 may obtain the record by querying transaction database 206 for a next record. As explained, transaction database 206 may store identifiable information and needs to be made secure so that the identifiable information within the database will be inaccessible by a user who must use de-identified data. Transaction database 206 is secured by changing the database views to control access to the identifiable information within the database.

Next if the record is not already stored in secure cross-reference table 202 (step 503), de-identify software 402 may generate a random de-identification pointer not related to information in the associated record (step 504). For example, software 402 may use a "Random class" or "SecureRandom class" both available in the JAVA standard API. Both classes produce sequences of pseudorandom numbers based on a seed value. Since the Random and SecureRandom classes may generate a same random number more than one time, software 402 also verifies that each generated random number has not been used in secure cross-reference table 202. The de-identification pointer is an index key and, as such, the de-identification pointer may not be duplicated in secure cross-reference table 202. Each de-identification pointer generated by software 402 may be checked against all other de-identification pointers in secure cross-reference table 202 to ensure that the de-identification pointer is not duplicated. One skilled in the art will appreciate that other methods may be used to generate the de-identification pointer, such as a shuffling algorithm.

Once the de-identification pointer is generated, software 402 incorporates the de-identification pointer into the record and inserts the record as a new record in secure cross-reference table 202 (step 505). For example, for the patient "J. Doe," software 402 may generate "123456" as the de-identification pointer and insert J. Doe's identifiable information and newly created de-identification pointer into secure cross-reference table 202.

Next, software 402 adds a record to de-identification index table 204 (step 506). The record may include the de-identification pointer and a transaction ID. The transaction ID may be obtained from secure transaction table 208. Each record in de-identification index table 204 is created for each transaction an individual has submitted and is stored in secure transaction table 208. Therefore, each time a new de-identification pointer is generated, software 402 searches secure transaction table 208 for all transactions associated with the individual associated with the de-identification pointer. For example, since J. Doe has had three transactions (4329, 2049 and 2002), three records will be added to de-identification index table 204. As explained, the de-identification index table links the de-identification pointers to the corresponding transaction information in the non-protected transaction table.

Next, software 402 adds a record to non-protected transaction table 205 (step 507). For example, the record may include the transaction ID and other information associated with the transaction obtained from secure transaction table 208 (e.g., date, procedure code, billing code and amount). A user may access de-identified information stored in non-protected transaction table 205. Finally, if there is another record in individual information table 207 (step 508), software 402 may obtain the new record (step 502). Otherwise, a user may begin retrieving de-identified data by using client software 408 and accessing de-identified index table 204 and non-protected transaction table 205.

Figure 6:
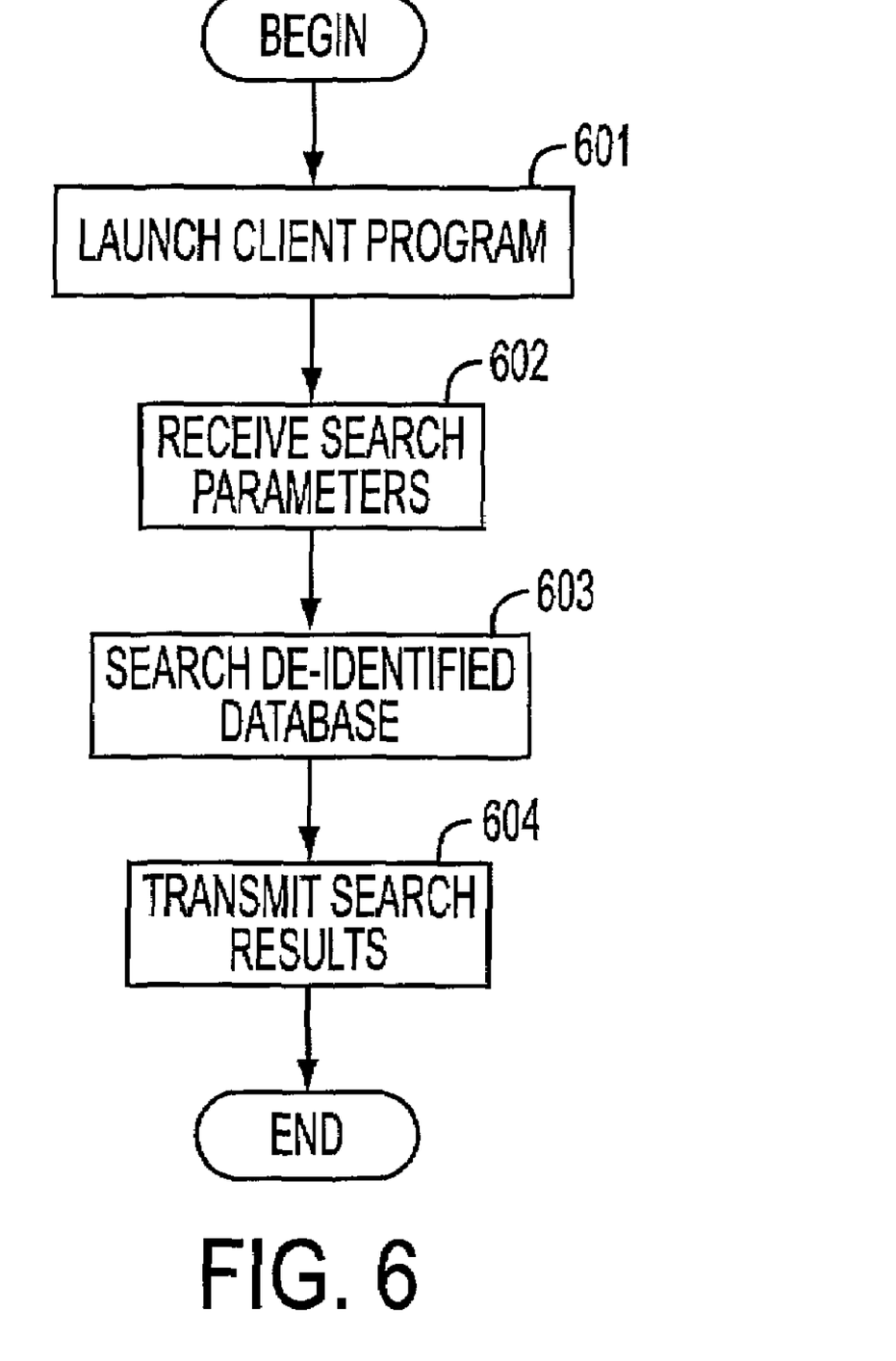
FIG. 6 shows a second flow chart representing one embodiment of the present invention.

FIG. 6 is a flow chart consistent with one embodiment of the present invention when retrieving de-identified data from non-protected transaction table 205. In Step 601, client software 408 may be initiated for example, by "double-clicking" on an icon (using a mouse) associated with software 408 or typing in the software name from a command line. Note that software 408 may be initiated using other methods, such as automatically executing the software during client computer 210 startup sequence.

Once initiated, a user may transmit search parameters to software 408 (step 602). The search parameters enable a user to locate de-identified data in de-identified database 203. For example, search parameters may be procedure code, date or a de-identification pointer. Once software 408 receives the search parameters, software 408 searches de-identified database 203 (step 603). Software 408 may search both de-identification index table 204 an non-protected transaction table 205 for any matches of the search parameters. Once the search is completed, client software 408 may display the search results to the user in Step 604.

What is claimed is:

1. A method comprising:
   receiving data corresponding to an individual, wherein the data includes transactional data stored in a transaction table and data identifying the individual stored in a personal information table, and wherein the individual is associated with at least one transaction in the transaction table;

generating a de-identification pointer associated with a portion of the data, wherein the de-identification pointer substitutes the data identifying the individual in the personal information table;

creating a non-protected transaction table, wherein the non-protected transaction table includes de-identified transactional data corresponding to the individual, the de-identified transactional data not being capable of identifying the individual; and creating an index table including the de-identification pointer and the non-protected transaction table.

2. The method of claim 1, wherein generating a de-identification pointer further includes the step of generating the de-identification pointer based on a shuffling algorithm, wherein the data identifying the individual stored in the personal information table cannot be derived from the de-identification pointer.

3. The method of claim 1, further including the steps of:
securing the transaction table by implementing a database view to control access to the transaction table; and
initiating the index table, the non-protected transaction table and a secure reference table, wherein the secure reference table includes identifiable information and the de-identification pointer.

4. The method of claim 1, further including the steps of:
querying the personal information table for a record comprising data identifying an individual; and
if a new record exists, generating de-identification pointer not derived from information associated with the record, wherein the de-identification pointer is not being capable of identifying the individual.

5. The method of claim 1, wherein generating the de-identification pointer associated with a portion of the data further comprising verifying that the generated de-identification pointer is not duplicated in the index table.

6. The method of claim 3, further including the step of incorporating the de-identification pointer into a new record and adding the new record in the secure reference table.

7. A computer for de-identifying data stored in a transaction table comprising transactions and a personal information table comprising identifiable information, the computer comprising:
a memory comprising software providing instructions for:
(i) generating a de-identification pointer associated with an individual in the personal information table, wherein the de-identification pointer substitutes data identifying the individual, and wherein the individual is associated with at least one transaction in the transaction table;

(ii) creating a non-protected transaction table, wherein the non-protected transaction table includes de-identified transactional data corresponding to the individual, the de-identified transactional data not being capable of identifying the individual;

(iii) creating an index table including the identification pointer and the non protected transaction table; and a processor to execute the software.

8. The computer of claim 7, wherein the software providing instructions for generating the de-identification pointer comprises providing instructions for generating the de-identification pointer based on a shuffling algorithm, wherein any data elements associated with the personal information table cannot be derived from the identification pointer.

9. The computer of claim 7, wherein the memory further comprising software for initializing the index table, the non-protected transaction table and a secure reference table, wherein the secure reference table includes data that identifies the individual information and the identification pointer.

10. The computer of claim 7, wherein the memory further comprising software providing instructions for querying the personal information table for a record comprising data identifying an individual and generating a de-identification pointer not derived from information associated with the record, if a new record exists.

11. The computer of claim 7, wherein the memory further comprising software providing instructions for
(i) generating a de-identification pointer not based a subset of the data identifying an individual for each record in the personal information table; and
(ii) verifying that the generated de-identification pointer is not duplicated in the index table.

12. The computer of claim 7, wherein the memory further comprising software providing instructions for incorporating the de-identification pointer into a new record and adds the new record in the secure reference table.

13. The computer of claim 7, wherein the memory further comprising software providing instructions for securing the transaction database by implementing a database view to control access to the transaction database.

* * * * *